United States Patent
Suzuki

(10) Patent No.: US 6,693,804 B2
(45) Date of Patent: Feb. 17, 2004

(54) SWITCHING POWER SUPPLY CIRCUIT

(75) Inventor: Sadanori Suzuki, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 68 days.

(21) Appl. No.: 10/053,190

(22) Filed: Jan. 15, 2002

(65) Prior Publication Data
US 2002/0097590 A1 Jul. 25, 2002

(30) Foreign Application Priority Data

Jan. 22, 2001 (JP) ........................................ 2001-013000

(51) Int. Cl.[7] .............................................. H02M 3/335
(52) U.S. Cl. ........................................ 363/24; 363/134
(58) Field of Search ............................. 363/24, 25, 26, 363/40, 56.01, 56.02, 132, 133, 134

(56) References Cited

U.S. PATENT DOCUMENTS

| | | | | |
|---|---|---|---|---|
| 4,823,249 A | * | 4/1989 | Garcia, II | 363/48 |
| 5,459,650 A | * | 10/1995 | Noro | 363/24 |
| 5,488,554 A | * | 1/1996 | Green | 363/25 |
| 5,532,913 A | * | 7/1996 | Suzuki et al. | 363/25 |
| 5,548,502 A | * | 8/1996 | Kosugi | 363/22 |
| RE36,040 E | * | 1/1999 | Ou | 363/25 |
| 5,895,983 A | * | 4/1999 | Motomura | 307/106 |
| 5,896,280 A | * | 4/1999 | Gucyski et al. | 363/24 |
| 6,040,662 A | * | 3/2000 | Asayama | 315/291 |
| 6,137,698 A | * | 10/2000 | Yukawa et al. | 363/25 |
| 6,356,467 B1 | * | 3/2002 | Belehradek, Jr. | 363/24 |

FOREIGN PATENT DOCUMENTS

| | | | | |
|---|---|---|---|---|
| JP | 63-206161 | 8/1988 | ......... | H02M/3/335 |
| JP | 7-67334 | 3/1995 | ......... | H02M/3/337 |
| JP | 9-224375 | 8/1997 | ......... | H02M/3/337 |

* cited by examiner

*Primary Examiner*—Adolf D. Berhane
(74) *Attorney, Agent, or Firm*—Morgan & Finnegan, LLP

(57) ABSTRACT

A transformer has a primary winding and a secondary winding. A center tap of the primary winding is connected with one end of a d.c. power supply. Both ends of the primary winding are connected to the drains of transistors (Q1) and (Q2) that constitute switching elements, respectively. Also, the sources of the transistors (Q1) and (Q2) are connected to the other ends of the d.c. power supply. The gates of the transistors (Q1) and (Q2) are connected to one ends of gate resistors (R1) and (R2), respectively. The other ends of the gate resistors (R1) and (R2) are connected to a control circuit, and the resistance of the gate resistor (R2) is larger than the resistance of the gate resistor (R1).

8 Claims, 5 Drawing Sheets

SWITCHING POWER SUPPLY CIRCUIT

BACKGROUND OF THE INVENTION

1. Field of the Invention

The present invention relates to a switching power circuit.

2. Description of the Related Art

Hitherto, a push-pull type switching power supply circuit is generally employed in a switching power circuit.

In the push-pull type switching power supply circuit there occurs a noise that influences on a radio or the like (for example, AM band) as in a switching power supply circuit having another structure. Therefore, various countermeasures for preventing the noise occurrence have been conducted in the push-pull type switching power circuit.

For example, a structure is employed in which a noise filter is added to a switching power supply circuit to prevent the noise from occurring. Also, a resonant type switching power supply circuit consisting of an LC resonant circuit is structured as disclosed in Japanese Patent Application Laid-open No. Hei 7-67334, or a secondary rectifying circuit and a tertiary rectifying circuit are added as disclosed in Japanese Patent Application Laid-open No. Hei 9-224375, to thereby prevent the noise from occurring.

However, even in the above-mentioned push-pull type switching power circuits thus structured, a new component needs to be added, resulting in such a problem that the switching power supply circuit becomes high in the costs.

SUMMARY OF THE INVENTION

The present invention has been made in order to solve the above-mentioned problem, and an object of the present invention is to provide without adding new components a switching power supply circuit that has a high effect in reducing the noise.

A switching power supply circuit according to the present invention comprises: a d.c. power supply; and a switching means having a plurality of switching elements connected to the d.c. power supply to conduct the switching operation of alternately turning on/off at a switching frequency, wherein a component of a frequency that is twice as high as the switching frequency becomes less than or equal to the component of the switching frequency in a spectrum of a current that is supplied from the d.c. power supply by making the switching elements conduct the switching operations differently from each other.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

Figure 1:
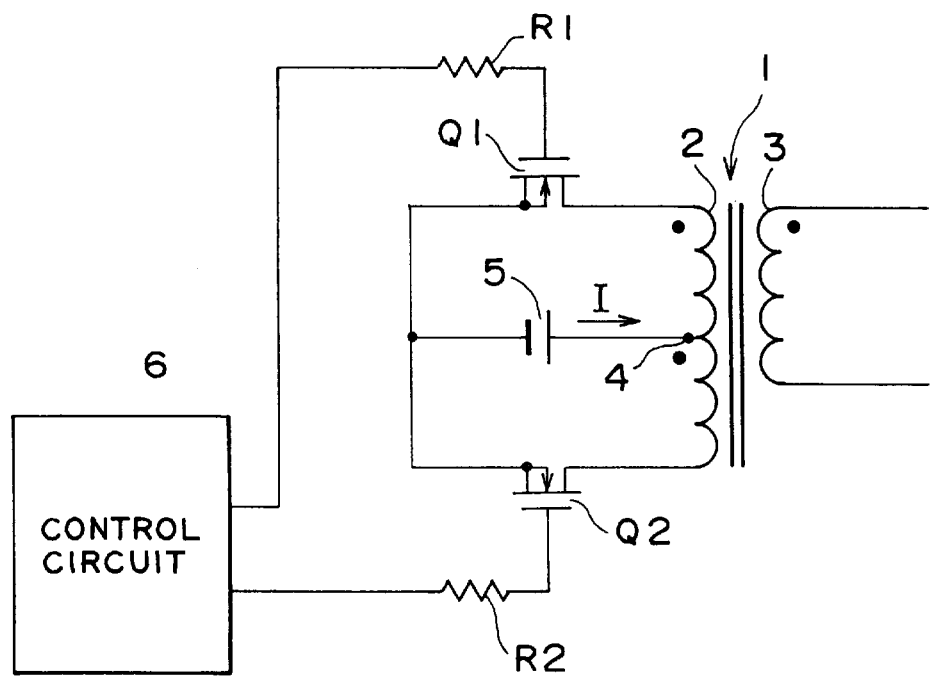
FIG. 1 is a diagram showing the structure of a switching power supply circuit in accordance with an embodiment of the present invention.

As shown in FIG. 1, in a switching power supply circuit in accordance with an embodiment of the present invention, a primary winding 2 and a secondary winding 3 are disposed on a transformer 1. A center tap 4 of the primary winding 2 is connected with one end of a d.c. power supply 5. Both ends of the primary winding 2 are connected respectively to the drains of transistors Q1 and Q2 that function as switching elements. Also, the sources of the transistors Q1 and Q2 are connected to the other end of the d.c. power supply 5. The gates of the transistors Q1 and Q2 which constitute control terminals are connected to the respective one ends of gate resistors R1 and R2. The other ends of the gate resistors R1 and R2 are connected to a control circuit 6. As for the resistances of the gate resistors R1 and R2, the resistance of the gate resistor R1 is 30 Ω, the resistance of the gate resistor R2 is 100 Ω, so that the resistance of the gate resistor R2 is larger than the resistance of the gate resistor R1.

Then, for convenience of the description of the operation of the switching power supply circuit in accordance with the embodiment, in the switching power supply circuit structured as described above, the operation in the case where the resistance of the gate resistor R2 is set to be identical with the resistance of the gate resistor R1 will be described.

Figure 2:
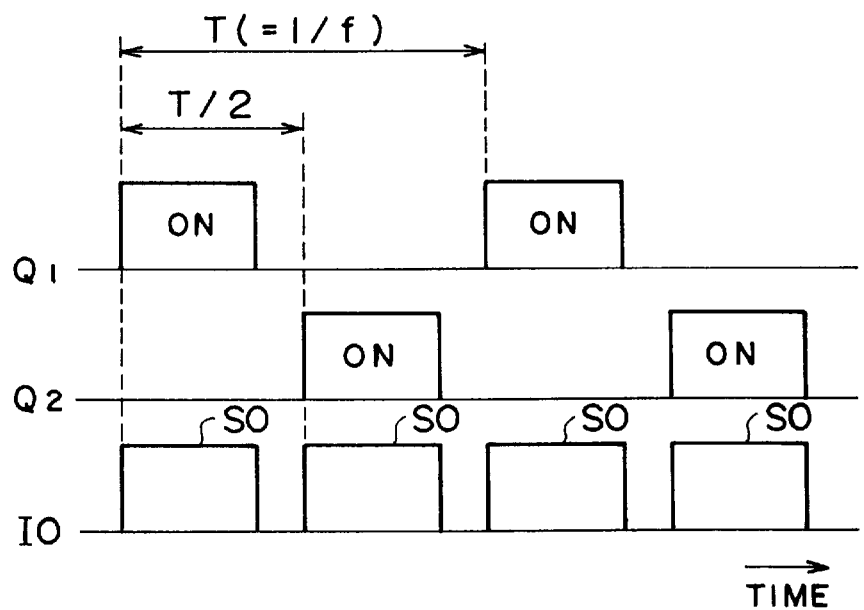
FIG. 2 is a timing chart showing the operation of a transistor and the waveform of a current that flows in a primary winding in the case where two gate resistances are set to be equal to each other in the switching power supply circuit shown in FIG. 1.

In the switching power supply circuit as shown in FIG. 2, the control circuit 6 repeats the operation of alternately turning on/off the transistors Q1 and Q2. The period from the transistor Q1 turning on to the next time Q1 turns on is set to be T=0.0125 msec, and the transistors Q1 and Q2 are alternately turned on/off at a switching frequency, i.e., f=1/T 80 kHz. In this situation, a current I0 from the d.c. power supply 5 flows in the primary winding 2 as a switching current that alternately flows in the respective ends of the primary winding 2 from the center tap 4.

In the case where the resistances of the gate resistors R1 and R2 are equal to each other, because the switching operations of the transistors Q1 and Q2 are identical with each other, all the waveforms S0 of the current I0 that flows in the primary winding 2 of the transformer 1 are substantially identical with each other. The waveforms S0 are repeatedly generated at a frequency 2f which is twice as high as the switching frequency f.

Figure 3:
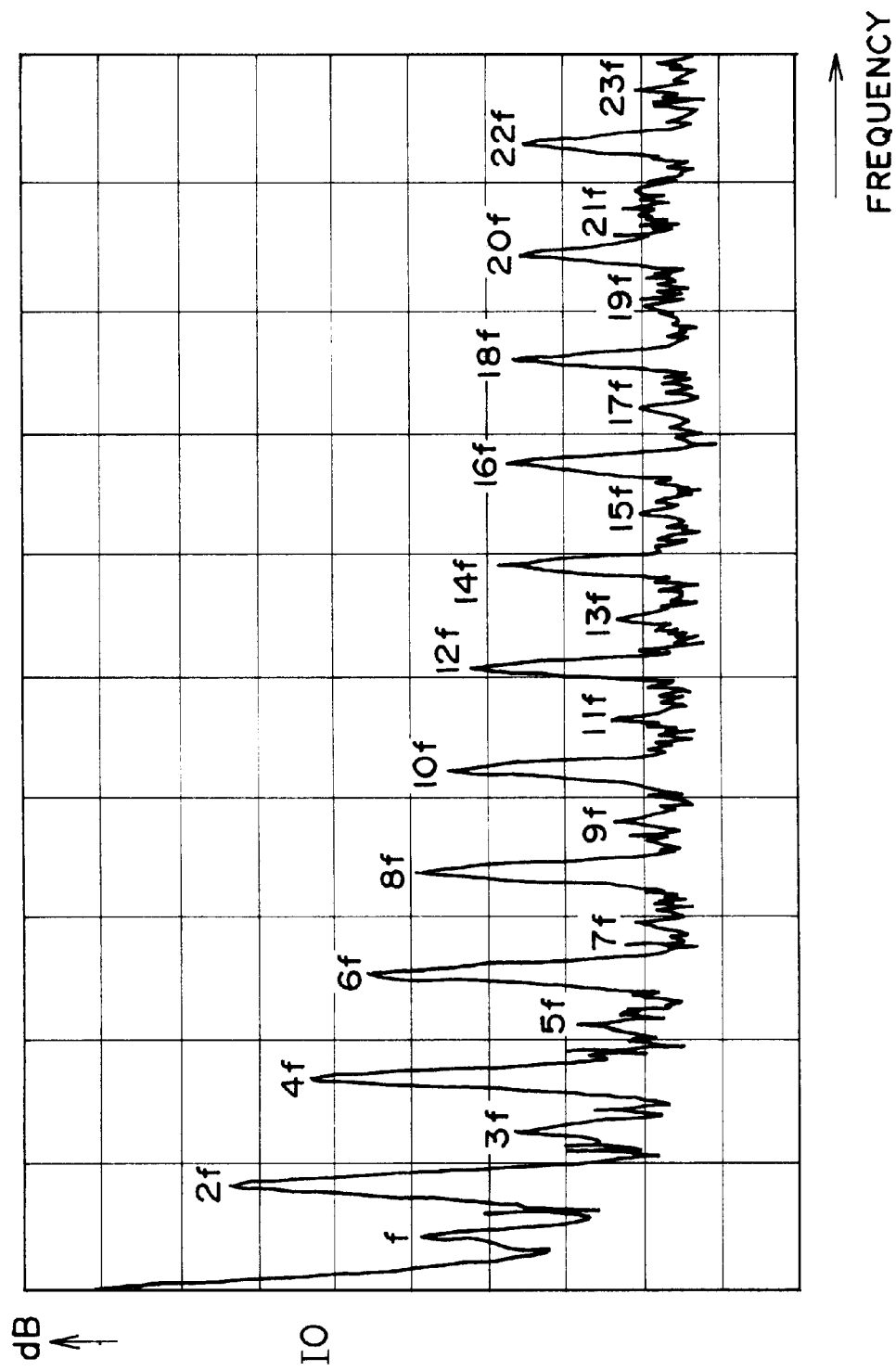
FIG. 3 is a chart showing a spectrum of the current that flows in the primary winding in the case where the two gate resistances are set to be equal to each other in the switching power supply circuit shown in FIG. 1.

As shown in FIG. 3, in the spectrum of the waveform S0 of the current I0, the components of the frequency 2f that is twice as high as the switching frequency f, and of the integral multiple of the frequency 2f (4f, 6f, . . . ) become larger in value. On the other hand, the components of the switching frequency f and of the odd multiple thereof (3f, 5f, . . . ) become still smaller in value. Because the value of the component of the frequency 2f that is twice as high as the switching frequency f is large, the values of the components of the integral multiple thereof (4f, 6f, . . . ) also become larger in association with the value of the component of the frequency 2f. For that reason, the current I0 is high in noise level as a whole, and a noise that is adversely influenced on an AM radio or the like occurs.

Subsequently, a description will be given of the operation of the switching power supply circuit according to the embodiment in which the resistance of the gate resistor R2 is larger than the resistance of the gate resistor R1.

Figure 4:
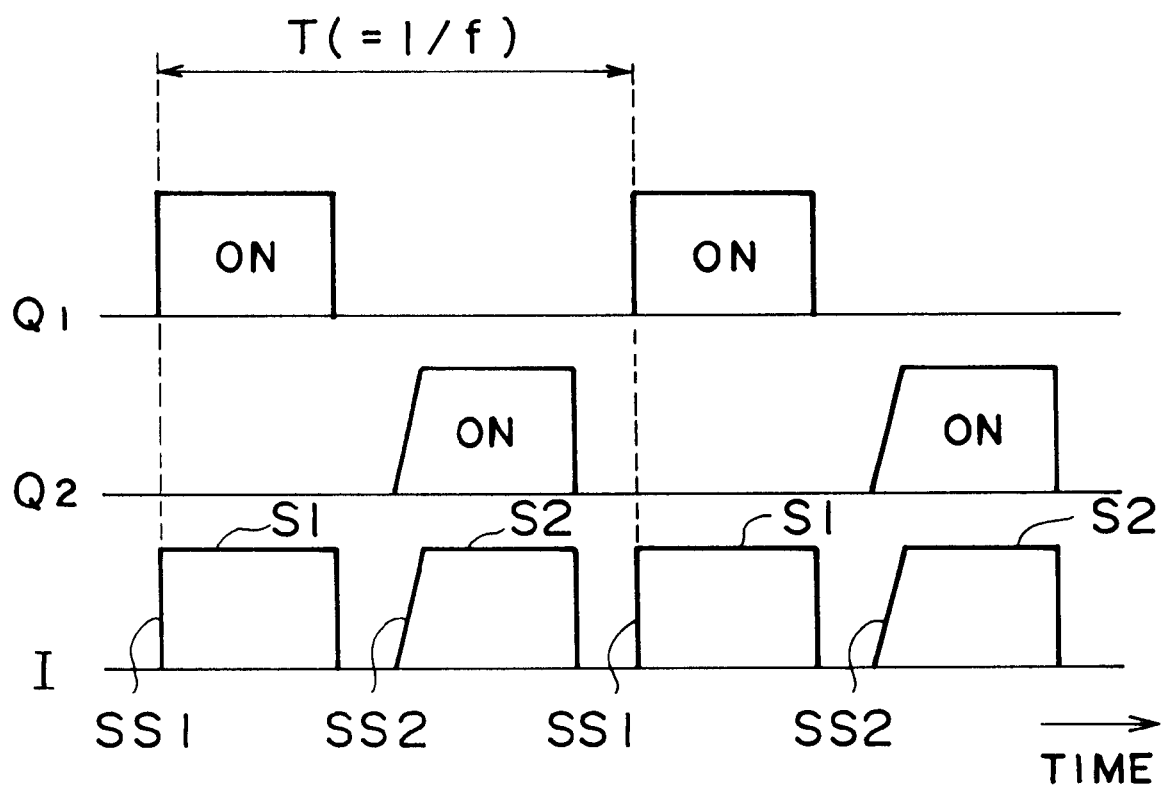
FIG. 4 is a timing chart showing the operation of a transistor and the waveform of a current that flows in the primary winding in a switching power supply circuit in accordance with the embodiment of the present invention.

In the switching power supply circuit, as shown in FIG. 4, the control circuit 6 repeats the operation of alternately turning on/off the transistors Q1 and Q2 at the switching frequency f.

In the case where the transistor Q1 is turned on, the waveform S1 of the current I that flows in the primary winding 2 contains a rising waveform SS1 corresponding to the resistance of the gate resistor R1. On the other hand, in the case where the transistor Q2 is turned on, the waveform S2 of the current I that flows in the primary winding 2 draws a rise waveform SS2 inclined as compared with the rise waveform SS1 when the transistor Q1 is turned on. In this way, since the resistance of the gate resistor R2 is larger than the resistance of the gate resistor R1, the switching operations of the transistors Q1 and Q2 are different from each other, and the waveform S1 and the waveform S2 are different from each other in waveform. The waveforms S1 and S2 are repeatedly generated at the switching frequency f, respectively.

Figure 5:
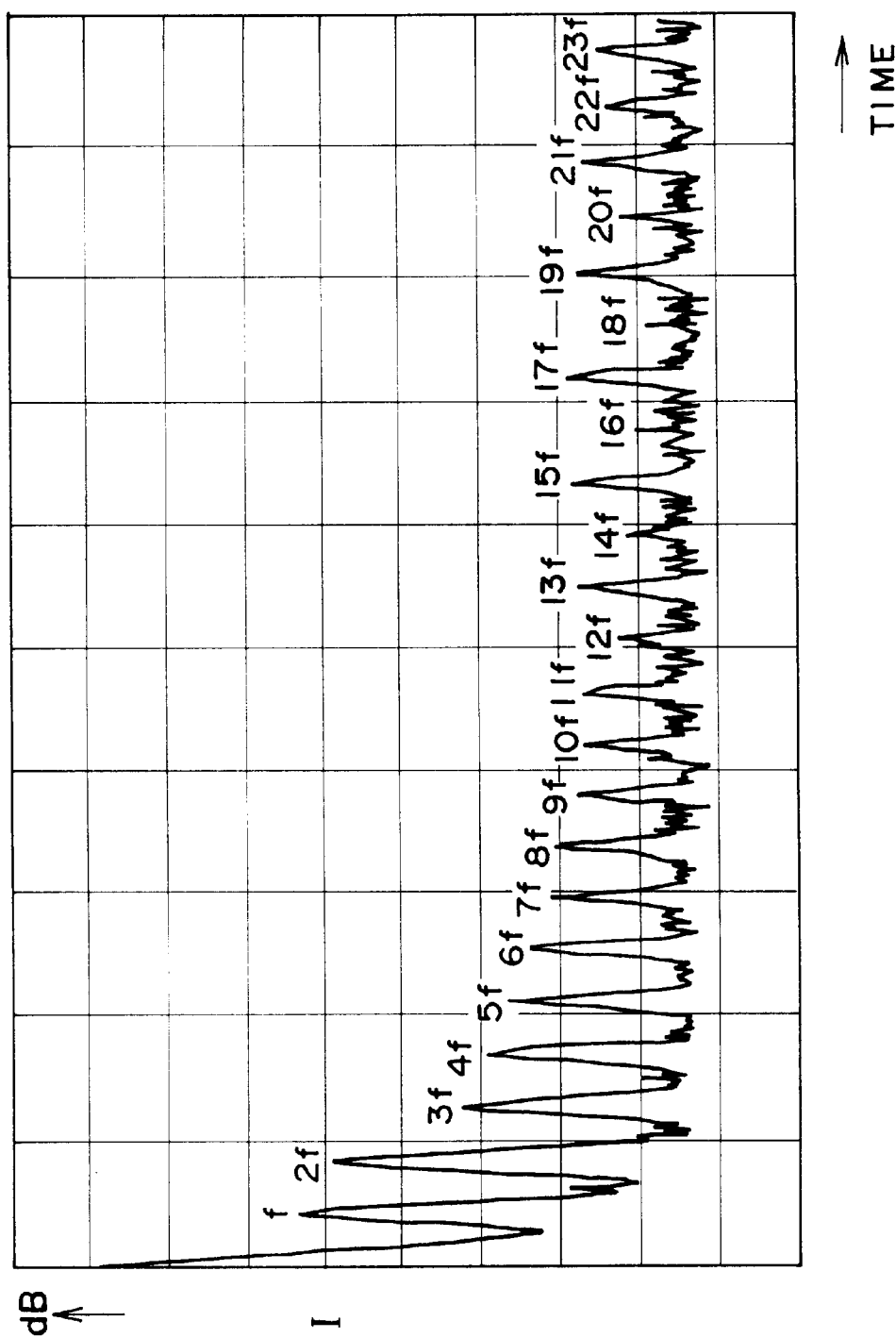
FIG. 5 is a chart showing a spectrum of a current that flows in a primary winding in a switching power supply circuit in accordance with the embodiment of the present invention.

As shown in FIG. 5, in the spectrum of the waveforms S1 and S2 of the current I, the value of the component of the frequency 2f which is twice as high as the switching frequency becomes less than or equal to the value of the component of the switching frequency f. Also, the value of components of the integral multiple of the frequency 2f (4f, 6f, . . . ) that is twice as high as the switching frequency f is smaller than that in FIG. 3, with the result that the noise level as the entire spectrum of the current I is lowered. Therefore, in the case where the switching power supply circuit according to this embodiment is mounted in a vehicle, the noise that is influenced on a radio or the like becomes smaller than that in the case where the resistance of the gate resistor R1 and the resistance of the gate resistor R2 are identical with each other.

As described above, the resistance of the gate resistor R2 is set larger than the resistance of the gate resistor R1 to unbalance the switching operations of the transistors Q1 and Q2 so that the value of the component of the frequency 2f that is twice as high as the switching frequency among the components of the current I that flows in the primary winding 2 of the transformer 1 becomes less than or equal to the value of the component of the switching frequency f, and thereby it is capable of lowering the noise level as the entire spectrum of the current I.

The characteristics of the transistors Q1 and Q2 per se may be different from each other as a method of unbalancing the switching operations of the transistors Q1 and Q2 other than the method in which the resistances of the gate resistors R1 and R2 are set slightly different from each other as in the above-mentioned embodiment. Also, the characteristics of the drive circuits of the transistors Q1 and Q2 may be made different from each other. In addition, the drive signals of the transistors Q1 and Q2 may be different from each other by the control circuit 6.

The resistances of the gate resistors R1 and R2 are not limited to 30 and 100, respectively, but may be appropriately selected under the conditions where the resistance of R2 is larger than the resistance of R1.

The transistors Q1 and Q2 may be formed of, for example, FETs, bipolar transistors, IGBTs or the like as long as they have the switching function. Also, in case of the bipolar transistor, its base constitutes a control terminal.

Further, the push-pull type switching power supply circuit as shown in FIG. 1 is described herein. However, in addition to this, it may be also achieved in a full-bridge or half-bridge circuit that the value of the component of the frequency 2f which is twice as high as the switching frequency becomes less than or equal to the value of the component of the switching frequency f.

Figure 6:
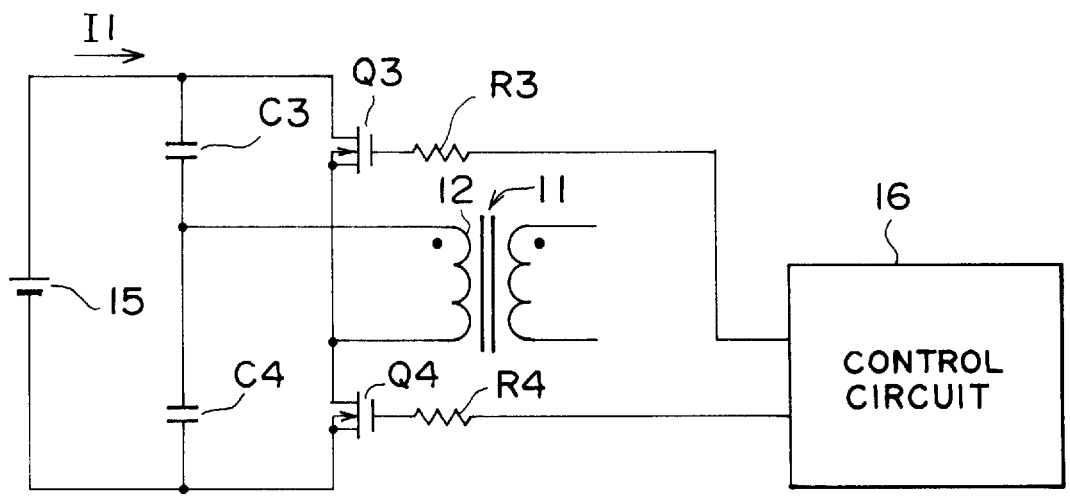
FIG. 6 is a diagram showing an example in which a switching power supply circuit is applied to a half bridge circuit in accordance with another embodiment of the present invention.

FIG. 6 shows an example in which the switching power supply circuit according to the present invention is applied to a half bridge circuit.

One end of a primary winding 12 of a transformer 11 is connected to a positive pole of a d.c. power supply 15 through a capacitor C3, and also is connected to a negative pole of the d.c. power supply 15 through a capacitor C4. The other end of the primary winding 12 of the transformer 11 is connected to the positive pole of the d.c. power supply 15 through a transistor Q3, and also is connected to the negative pole of the d.c. power supply 15 through a transistor Q4. The gate terminal of the transistor Q3 is connected to the control circuit 16 through a resistor R3. The gate terminal of the transistor Q4 is connected to a control circuit 16 through a resistor R4. In this example, the control circuit 16 also includes the drive circuits of the transistors Q3 and Q4 to control the switching operation of alternately turning on/off the transistors Q3 and Q4. Also, the gate terminals of the transistors Q3 and Q4 constitute the control terminals of the transistors Q3 and Q4, respectively.

In this example, if the resistances of the resistors R3 and R4 are different from each other, the current waveform when the transistor Q3 turns on and the current waveform when the transistor Q4 turns on are different from each other.

The resistances of the resistors R3 and R4 are adjusted so that the value of the component of the frequency 2f that is twice of the switching frequency becomes less than or equal to the value of the component of the switching frequency f, and thereby it is capable of lowering the noise level as the entire spectrum of the current I1.

Figure 7:
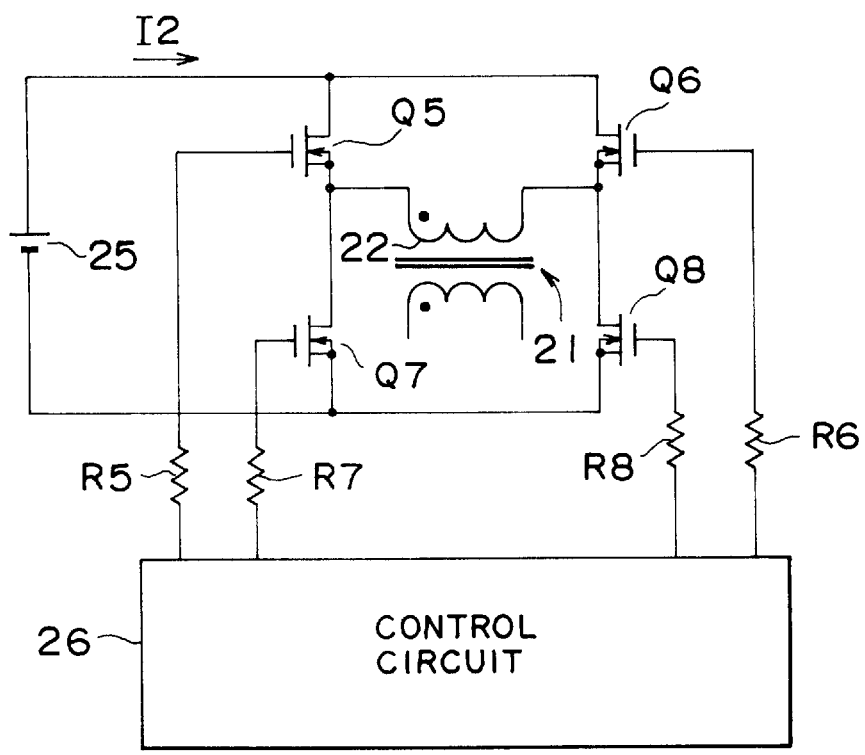
FIG. 7 is a diagram showing an example in which a switching power supply circuit is applied to a full bridge circuit in accordance with still another embodiment of the present invention.

FIG. 7 shows an example in which the switching power supply circuit according to the present invention is applied to a full bridge circuit.

One end of a primary winding 22 of a transformer 21 is connected to the positive pole of a d.c. power supply 25 through a transistor Q5, and also is connected to the negative pole of the d.c. power supply 25 through a transistor Q7. The other end of the primary winding 22 of the transformer 21 is connected to the positive pole of the d.c. power supply 25 through a transistor Q6, and also is connected to the negative pole of the d.c. power supply 25 through a transistor Q8. The gate terminals of the transistors Q5, Q6, Q7 and Q8 are connected to the control circuit 26 through resistors R5, R6, R7 and R8, respectively. In this example, the control circuit 26 includes the drive circuits of the transistors Q5, Q6, Q7 and Q8 and controls the switching operations of the transistors Q5, Q6, Q7 and Q8. Also, the gate terminals of the transistors Q5, Q6, Q7 and Q8 constitute the control terminals of the transistors Q5, Q6, Q7 and Q8, respectively.

The switching operations of the transistors Q5, Q6, Q7 and Q8 will be described in more detail. The transistors Q5 and Q8 turn on at the same time, and the transistors Q6 and Q7 turn on at the same time. Then, the transistors Q5 and Q8, and the transistors Q6 and Q7 alternately repeat the on/off operation.

In this example, the current waveform when the transistors Q5 and Q8 turn on at the same time can be determined by the resistances of the resistors R5 and R8. On the other hand, the current waveform when the transistors Q6 and Q7 turn on at the same time can be determined by the resistances of the resistors R6 and R7. Therefore, the current waveform when the transistors Q5 and Q8 turn on at the same time and the current waveform when the transistors Q6 and Q7 turn on at the same time can be made different from each other by adjusting the resistances of the resistors R5, R6, R7 and R8.

The resistances of the resistors R5, R6, R7 and R8 are adjusted so that the value of the component of the frequency 2f that is twice as high as the switching frequency becomes less than or equal to the value of the component of the switching frequency f, thereby being capable of lowering the noise level as the entire spectrum of the current I2.

What is claimed is:

1. A switching power supply circuit comprising:

a d.c. power supply; and a switching means having a plurality of switching elements connected to the d.c. power supply to conduct the switching operation of alternately turning on/off at a switching frequency, wherein the switching elements conduct the switching operation differently from each other so that in a special frequency waveform of a current that is supplied from the DC power supply, a spectral frequency component corresponding to twice the switching frequency is smaller than a spectral frequency component corresponding to the switching frequency.

2. A switching power supply circuit according to claim 1, wherein the switching means has resistors that are connected to the respective switching elements and different in the resistance, and the switching means conduct the different switching operation due to a difference of those resistances.

3. A switching power supply circuit according to claim 2, wherein the switching means includes a transistor as the switching element and a control circuit that controls the switching operation, and the resistors are connected to a control terminal of the transistor.

4. A switching power supply circuit according to claim 1, further comprising a transformer having a primary winding to which the switching means is connected.

5. A switching power supply circuit according to claim 4, wherein the d.c. power supply is connected to a center tap of the primary winding of the transformer, wherein the switching means comprises:

transistors as a pair of switching elements connected to both ends of the primary winding, respectively;

a control circuit that controls the switching operation of the pair of transistors;

a first resistor whose one end is connected to a first transistor of the pair of transistors, and whose other end is connected to the control circuit; and a second resistor whose one end is connected to a second transistor of the pair of transistors, and whose other end is connected to the control circuit, and wherein the pair of transistors conduct the switching operations differently from each other due to a difference between the resistance of the first resistor and the resistance of the second resistor.

6. A half-bridge type switching power supply circuit, comprising:

a d.c. power supply;

a transformer having a primary winding;

a first transistor whose one end is connected to one end of the primary winding of the transformer and whose other end is connected to a positive pole of the d.c. power supply;

a second transistor whose one end is connected to one end of the primary winding of the transformer and whose other end is connected to a negative pole of the d.c. power supply;

a first capacitor whose one end is connected to the other end of the primary winding of the transformer and whose other end is connected to a positive pole of the d.c. power supply;

a second capacitor whose one end is connected to the other end of the primary winding of the transformer and whose other end is connected to a negative pole of the d.c. power supply;

a control circuit that controls the switching operation of a pair of transistors;

a first resistor whose one end is connected to one of the pair of transistors and whose other end is connected to the control circuit; and a second resistor whose one end is connected to the other of the pair of transistors and whose other end is connected to the control circuit, wherein a spectral frequency component corresponding to twice the switching frequency becomes less than or equal to the spectral frequency component of the switching frequency in a spectrum of a current that is supplied from the d.c. power supply by making the pair of transistors conduct the switching operations differently from each other due to a difference between the resistance of the first resistor and the resistance of the second resistor.

7. A full-bridge type switching power supply circuit, comprising:

a d.c. power supply;

a transformer having a primary winding;

a first transistor whose one end is connected to one end of the primary winding of the transformer and whose other end is connected to a positive pole of the d.c. power supply;

a second transistor whose one end is connected to the other end of the primary winding of the transformer and whose other end is connected to a positive pole of the d.c. power supply;

a third transistor whose one end is connected to one end of the primary winding of the transformer and whose other end is connected to a negative pole of the d.c. power supply;

a fourth transistor whose one end is connected to the other end of the primary winding of the transformer and whose other end is connected to a negative pole of the d.c. power supply;

a control circuit that controls the switching operations of the first to fourth transistors;

a first resistor whose one end is connected to the first transistor and whose other end is connected to the control circuit;

a second transistor whose one end is connected to the second transistor and whose other end is connected to the control circuit; and a third resistor whose one end is connected to the third seventh transistor and whose other end is connected to the control circuit; and a fourth resistor whose one end is connected to the fourth transistor and whose other end is connected to the control circuit, wherein a spectral frequency component corresponding to twice the switching frequency becomes less than or equal to the spectral frequency component of the switching frequency in a spectrum of a current that is supplied from the d.c. power supply by making the first and fourth transistors and the second and third transistors conduct the switching operations differently from each other due to a difference between the resistances of the first to fourth resistors.

8. A switching power supply circuit comprising:

a d.c. power supply; and a switching means having a plurality of switching elements connected to the d.c. power supply to conduct the switching operation of alternately turning on/off at a switching frequency, wherein the switching elements conduct the switching operation differently from each other to make waves form of a current flowing in each switching element differ from each other so that in a special frequency waveform of a current that is supplied from the d.c. power supply, a spectral frequency component corresponding to twice the switching frequency is smaller than a spectral frequency component corresponding to the switching frequency.

* * * * *

UNITED STATES PATENT AND TRADEMARK OFFICE
CERTIFICATE OF CORRECTION

PATENT NO. : 6,693,804 B2
DATED : February 17, 2004
INVENTOR(S) : Suzuki

It is certified that error appears in the above-identified patent and that said Letters Patent is hereby corrected as shown below:

Column 7,
Lines 4-5, please delete "third seventh transistor" and insert therefore
-- third transistor --.

Signed and Sealed this

Fourth Day of May, 2004

JON W. DUDAS
*Acting Director of the United States Patent and Trademark Office*